United States Patent
Williamson et al.

[11] Patent Number: 6,048,133
[45] Date of Patent: Apr. 11, 2000

[54] METHOD FOR DISPOSING OF MINING PROCESS FINES

[75] Inventors: John Robin Gilmore Williamson, Johannesburg, South Africa; Charles Stephanus Marais, Cherry Brook, Australia; Matthew Jonathan Joseph Cobbett, Sunnyside; Timothy Peter Crossland, Sandton, both of South Africa

[73] Assignee: Ipcor NV, Curacao, Netherlands Antilles

[21] Appl. No.: 08/914,499

[22] Filed: Aug. 19, 1997

[30] Foreign Application Priority Data

Aug. 20, 1996 [ZA] South Africa .......................... 96/7071

[51] Int. Cl.$^7$ ...................................................... B09B 1/00
[52] U.S. Cl. .............................. 405/128; 405/15; 405/258
[58] Field of Search ................................ 405/15, 16, 258, 405/128; 175/66; 299/7; 210/790

[56] References Cited

U.S. PATENT DOCUMENTS

| | | | |
|---|---|---|---|
| 2,236,895 | 4/1941 | Court | 210/790 |
| 2,919,898 | 1/1960 | Marwil et al. | 175/66 |
| 3,459,003 | 8/1969 | O'Neal | 405/128 |
| 3,722,138 | 3/1973 | Veceslav | 405/128 |
| 4,448,690 | 5/1984 | Maphis | 210/609 |
| 4,611,951 | 9/1986 | Sapp | 405/128 |
| 5,007,771 | 4/1991 | Fu et al. | 405/128 |
| 5,439,317 | 8/1995 | Bishop et al. | 405/128 |
| 5,544,975 | 8/1996 | Vigneron et al. | 405/128 |

*Primary Examiner*—George Suchfield
*Attorney, Agent, or Firm*—Arnall Golden & Gregory, LLP

[57] ABSTRACT

A method of disposing of fines material includes the step of mixing a slurry containing fines material with a slurry containing coarse material to form a slurry which contains a mixture of fines material and coarse material. The slurry containing the mixture is deposited onto an inclined surface so that liquid can drain from the mixture. The mixture contains a majority of fines material by mass.

14 Claims, 1 Drawing Sheet

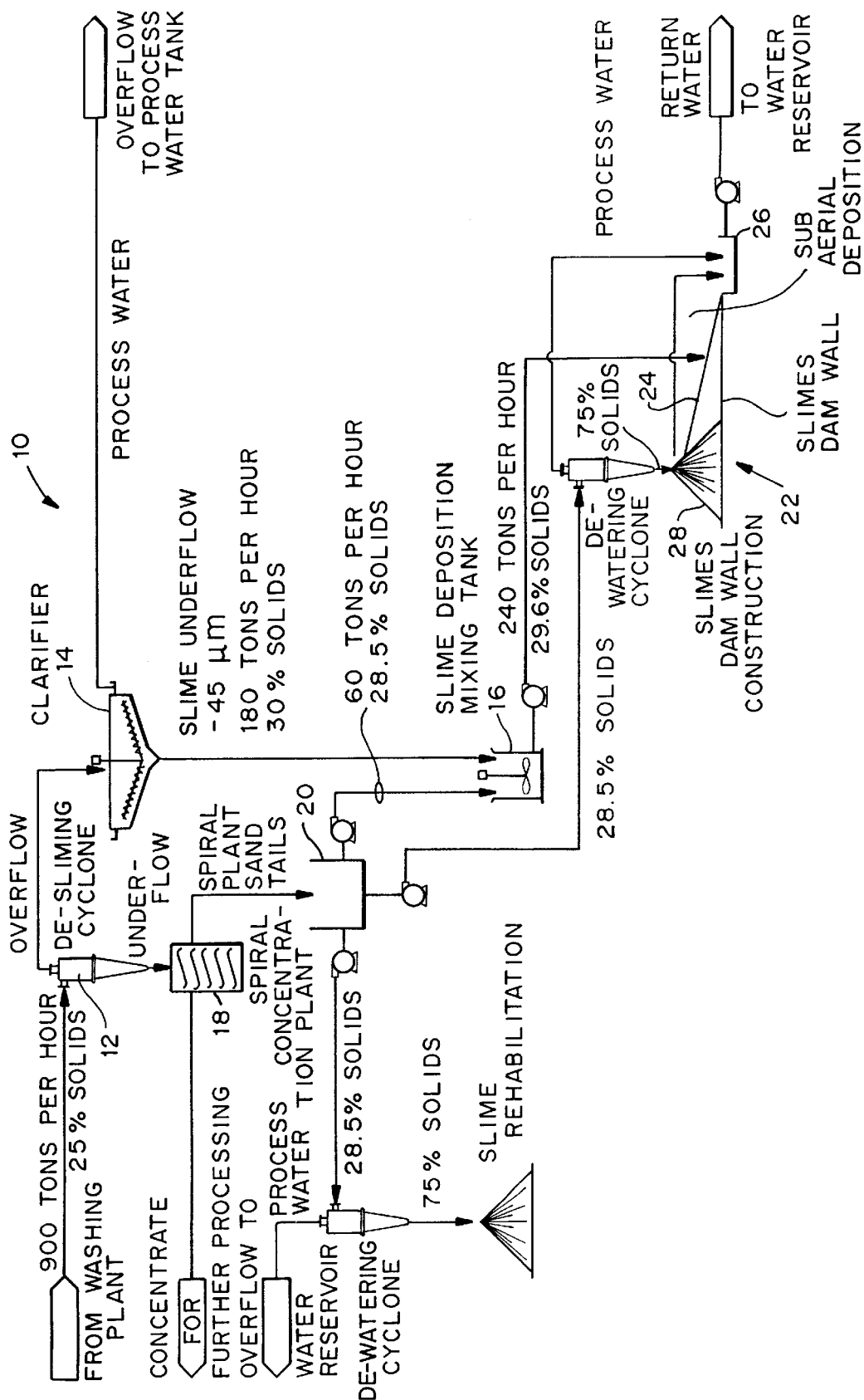

METHOD FOR DISPOSING OF MINING PROCESS FINES

FIELD OF INVENTION

This invention relates to a method of disposing of fines material.

BACKGROUND OF THE INVENTION

The disposal of slimes or fines material from sand dunes, which are mined to extract minerals, has hitherto posed a problem. When the fines material is deposited in layer, in for example a tailings dam, the layer cannot be rehabilitated. This is because the fines material, which comprises a clay-like material, retains water. The resultant layer is impervious and has a quicksand-like quality.

OBJECT OF THE INVENTION

It is accordingly an object of this invention at least to reduce the disadvantages associated with the prior art.

SUMMARY OF THE INVENTION

According to the invention a method of disposing of fines material includes the steps mixing fines material with coarse material to form a mixture in slurry form, and depositing the slurry onto a surface so that liquid can drain from the mixture.

In the preferred form of the invention, both the fines material and the coarse material are contained in slurries which are mixed to form the mixture in slurry form. Both the fines and coarse slurries may each contain between about 10% and about 50% solids by mass. Preferably the slurries each contain about 30% solids by mass.

The fines material may be minus 125 micron material, and preferably minus 45 micron material. The coarse material may be minus one millimeter and plus 125 micron material. Preferably the coarse material is minus one millimeter and plus 45 micron material.

The surface on which the slurry is deposited is preferably inclined so that the liquid can drain from the mixture under the influence of gravity. The surface may be inclined at between about 0.5° and about 5°. In the preferred form of the invention the surface is inclined at about 1°. The surface is preferably bounded by a drain at one side into which the liquid can drain, and walls on the other sides for containing the mixture.

The mixture of the fines and coarse material may comprise a majority of fines material by mass. The mixture may contain between about two to about six times as much fines material as coarse material by mass. In the preferred form of the invention the mixture contains about 75% fines material and about 25% coarse material by mass.

BRIEF DESCRIPTION OF THE DRAWING

FIG. 1 is a process flow sheet showing a plant for recovering heavy metals from sand dunes, illustrating the process equipment and flows incorporating the claimed method.

DETAILED DESCRIPTION OF THE INVENTION

The invention will now be described by way of a non-limiting example with reference to the accompanying flow sheet.

The flow sheet is that of a plant 10 for recovering heavy minerals such as titanium, zircon and rutile from sand dunes. Sand from the sand dunes is mixed with water and supplied in slurry form to a cyclone 12. The overflow of minus 45 micron fines from the cyclone, is discharged into a clarifier 14. The underflow from the clarifier 14 is discharged into a mixer 16 at a rate of 180 tons/hour. The clarifier underflow contains 30% fines material by mass.

The underflow of minus 1 mm and plus 45 micron coarse material form the cyclone 12, is fed into a spiral classifier 18. The tailings from the spiral classifier 18 are discharged into a sump 20. A slurry containing 28.5% coarse material by mass is discharged at a rate of 60 tons per hour into the mixer 16. Thus 17.1 tons of coarse material and 60 tons of fines material are mixed together within the mixer 16 per hour.

The mixture from the mixer 16 is deposited into a slimes dam 22. This is known as sub aerial deposition. The slimes dam 22 has a surface 24 inclined at about 1° onto which the mixture is deposited. The water drains, under the influence of gravity, from the mixture into a drain 26, located along one side of the slimes dam 22. Walls 28, made of the coarse material, form the other sides of the slimes dam 22. Separate paddocks (not shown) are formed within the slimes dam 22, so the mixture can be sequentially deposited at suitable intervals into the separate paddocks.

It is believed that the larger coarse particles form traps for the smaller fines particles, whilst allowing the water to flow through the traps into the drain 26 or to be evaporated before it reaches the drain 26. The resultant mixture of coarse and fine particles is pervious, and does not have a quicksand-like nature. The mixture is thus suitable for environmental rehabilitation in the sense that plants can be grown on it. The entire slimes dam can thus be rehabilitated.

It will be appreciated that many modifications or variations of the invention are possible without departing from the spirit or scope of the invention.

We claim:

1. A method of disposing of fines material comprising:
   (a) mixing fines material with coarse material to form a mixture in slurry form, and
   (b) depositing the slurry onto an inclined surface so that liquid can drain from the mixture.
2. The method of claim 1 wherein the fines material and the coarse material are contained in slurries which are mixed to form the mixture in slurry form.
3. The method of claim 2 wherein the slurries containing the fines and coarse material each contain between about 10% and about 50% solids by mass.
4. The method of claim 3 wherein the slurries each contain about 30% solids by mass.
5. The method of claim 1 wherein the fines material is minus 125 micron material.
6. The method of claim 1 wherein the fines material is minus 45 micron material.
7. The method of claim 5 wherein the coarse material is minus one millimeter and plus 125 micron material.
8. The method of claim 6 wherein the coarse material is minus one millimeter and plus 45 micron material.
9. The method of claim 1 wherein the surface is inclined at between about 0.5° and 5°.
10. The method of claim 9 wherein the surface is inclined at about 1°.
11. The method of claim 1 wherein the surface is bounded by a drain at one of its sides and by walls on the other of its sides.
12. The method of claim 1 wherein the mixture of fines and coarse material comprises a majority of fines by mass.
13. The method of claim 12 wherein the mixture contains between about two to about six times as much fines material as coarse material by mass.
14. The method of claim 12 wherein the mixture contains about 75% fines material by mass and about 25% coarse material by mass.

* * * * *